United States Patent [19]
Muto et al.

[11] 3,874,062
[45] Apr. 1, 1975

[54] PROCESS FOR FABRICATING A COLUMNAR ASSEMBLY OF SPACED REINFORCING BARS

[75] Inventors: Kiyoshi Muto, Tokyo; Yasuhisa Yamamoto, Kyoto; Yoshinori Toyoda; Shozo Azemi, both of Chiba; Shigeru Okano, Ichihara; Kenya Masuyama, Chiba; Seitaro Aihara, Tokyo; Takao Ito, Tokyo; Isamu Ogawa, Tokyo; Mitsumasa Harada, Tokyo, all of Japan

[73] Assignee: Kajima Kensetsu Kabushiki Kaisha, Tokyo, Japan

[22] Filed: Aug. 28, 1973

[21] Appl. No.: 392,373

[30] Foreign Application Priority Data
Mar. 16, 1973 Japan.............................. 48-30607

[52] U.S. Cl..................... 29/428, 29/155 C, 52/745
[51] Int. Cl............................................ B23p 11/00
[58] Field of Search.......... 29/469, 155 C, 428, 464, 29/467; 140/111; 52/741, 745

[56] References Cited
UNITED STATES PATENTS
| | | | |
|---|---|---|---|
| 798,730 | 9/1905 | Johnson | 29/155 C |
| 1,011,104 | 12/1911 | Bates | 29/155 C |
| 3,296,690 | 1/1967 | Barron | 52/741 |
| 3,376,001 | 4/1968 | Wieme | 140/111 |
| 3,407,560 | 10/1968 | Baumann | 52/741 |

Primary Examiner—C. W. Lanham
Assistant Examiner—James R. Duzan
Attorney, Agent, or Firm—Sughrue, Rothwell, Mion, Zinn & Macpeak

[57] ABSTRACT

A process for fabricating a columnar assembly of spaced reinforcing bars comprising the steps of suspending a first plurality of reinforcing bars in parallel, spaced relationship; positioning a first constraining hoop in a plane generally perpendicular to said first plurality of reinforcing bars and in contact therewith; attaching said first plurality of reinforcing bars to said first constraining hoop; positioning a second plurality of reinforcing bars in spaced relationship to each other, parallel to said first plurality of reinforcing bars, and in contact with said first constraining hoop; and attaching said second plurality of reinforcing bars to said first constraining hoop. A variety of additional reinforcing bars and constraining hoops may be added in various ways to the basic unit.

21 Claims, 17 Drawing Figures

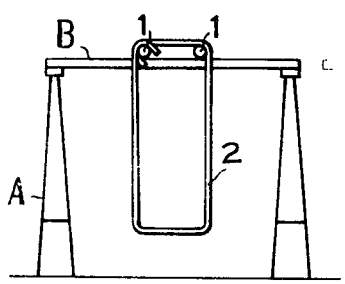
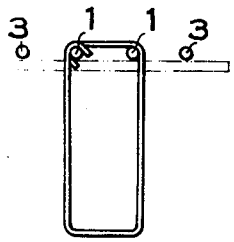
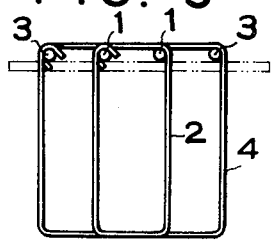
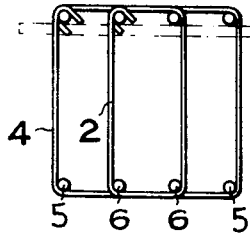
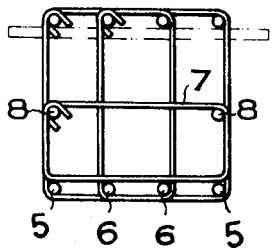
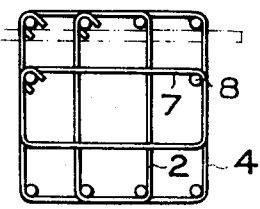
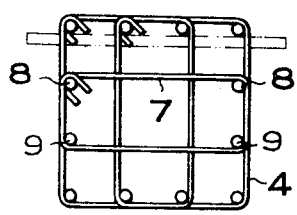

PROCESS FOR FABRICATING A COLUMNAR ASSEMBLY OF SPACED REINFORCING BARS

BACKGROUND OF THE INVENTION

1. Field of the Invention

The present invention is of a process for fabricating a columnar assembly of spaced reinforcing bars, such as are used to reinforce concrete columns in the construction industry. This invention is particularly adapted for use in on-site construction, but is, of course, not limited to such use.

2. Description of the Prior Art

It has been conventional in the construction industry to install main reinforcing bars in their intended position, then attach spaced hoops to the periphery thereof, then, if necessary, install intermediate reinforcing bars, all being in their final position as installed. However, this procedure is difficult and time-consuming particularly where intermediate reinforcing bars are required.

OBJECTS OF THE PRESENT INVENTION

In view of the drawbacks of the conventional procedure, the procedure disclosed and claimed herein has been devised, having, among others, the following objects:

1. to provide a process capable of efficiently and effectively fabricating a columnar assembly of spaced reinforcing bars;
2. to provide a process permitting fabrication of columnar assemblies of spaced reinforcing bars in a horizontal state on a job site, of effectuating the fabrication in a ready and simplified manner by following an established sequence of fabrication, and of enabling columnar assemblies of spaced reinforcing bars to be prefabricated; and
3. to provide a process permitting the fabrication with comparative ease of a complicated assembly of multiple reinforcing bars and multiple constraining hoops, in which some hoops and some main reinforcing bars are used to suspend or support other hoops and reinforcing bars in a proper sequential manner, thus enabling fabrication of the complete assembly in a favorable sequence and without requiring any special supports.

SUMMARY OF THE INVENTION

Speaking broadly, the present invention is of a process for fabricating a columnar assembly of spaced reinforcing bars comprising the steps of suspending a first plurality of reinforcing bars in parallel, spaced relationship; positioning a first constraining hoop in a plane generally perpendicular to said first plurality of said reinforcing bars and in contact therewith; attaching said first plurality of reinforcing bars to said first constraining hoop; positioning a second plurality of reinforcing bars in spaced relationship to each other, parallel to said first plurality of reinforcing bars, and in contact with said first constraining hoop; and attaching said second plurality of reinforcing bars to said first constraining hoop. A variety of additional reinforcing bars and constraining hoops may be added in various ways to the basic unit.

BRIEF DESCRIPTION OF THE DRAWINGS

FIGS. 3–9 are side views showing the sequence of fabrication of a complex assembly, with suspending means A omitted from all but FIG. 3 for the sake of simplicity.

DESCRIPTION OF THE PREFERRED EMBODIMENTS

The present invention may be illustrated by a detailed description of two embodiments thereof.

The First Preferred Embodiment

Figure 1:
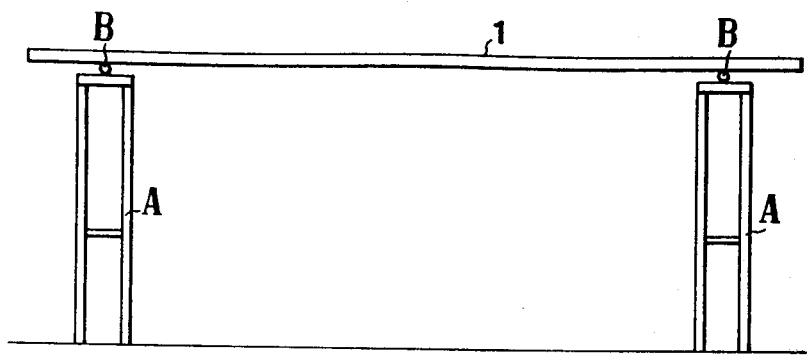
FIG. 1 is a front view showing one simple way of carrying out the initial step in the present invention.
Figure 2:
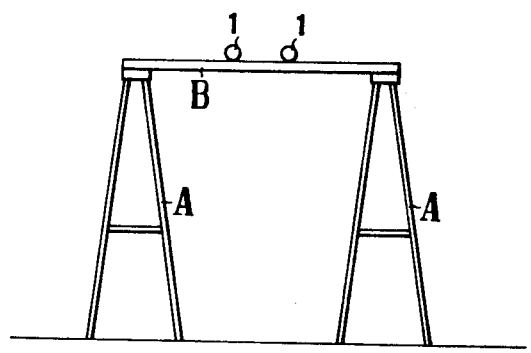
FIG. 2 is a side view of the apparatus shown in FIG. 1.

Both embodiments begin with a suspension of two upper intermediate reinforcing bars 1 on supporting rods B, as shown in FIGS. 1 and 2. The support rods B are themselves set in place on horses A or similar suspending means, and the two upper intermediate reinforcing bars 1 are suspended thereon in horizontal, parallel, spaced relationship.

Then, in the first embodiment (illustrated by FIGS. 3–9) a constraining hoop 2 is positioned in a plane generally perpendicular to the previously positioned reinforcing bars and in contact with them. In the process illustrated, the constraining hoop 2 is of open, lapped construction and is fabricated of a material sufficiently resilient so that the hoop 2 can be opened and inserted over the bars 1, following which the hoop 2 and the bars 1 are attached to each other with heavy wire or by any other appropriate means. However, the hoop 2 could be positioned internally of the bars 1 and suspended therefrom by the attachment therebetween. Similarly, the hoop 2 could be positioned so as to extend above the bars 1, and the hoop 2 could be some shape other than quadrilateral- for instance, elliptical. However, the preferred embodiment, as shown, is the quadrilateral shape positioned exteriorly of the bars 1 so that the bars 1 support its weight and so that the hoop 2 hangs down from the bars 1.

Next, as shown in FIG. 4, two upper main reinforcing bars 3 are suspended on the supporting rods B, one on each side of the two upper intermediate reinforcing bars 1. Then, as shown in FIG. 5, a second constraining hoop 4 is set in place on the upper main reinforcing bar 3. As illustrated, the hoop 4 is external of both the bars 1 and 3, but the comments previously made with respect to variance in the structure and positioning of hoop 2 apply here as well. Also, the order of emplacement of the assembly comprising the bars 1 and the hoop 2 and the assembly comprising the bars 3 and the hoop 4 may be reversed. However, once the two assemblies are in place, they are normally attached to each other with heavy wire or by any other appropriate means, although this step can be postponed.

Next, as illustrated by FIG. 6, two lower main reinforcing bars 5 and two lower intermediate reinforcing bars 6 are set in position and attached to the hoops 4 and 2 respectively.

Next, as illustrated by FIG. 7, a third constraining hoop 7 is temporarily balanced on the rods 5 and 6, and the upper lateral intermediate reinforcing bars 8 are inserted therethrough. (Of course, the comments previously made with respect to variance in the structure and positioning of the hoops 2 and 4 apply here as well.) The bars 8 may be attached to the hoop 7 with heavy wire or by any other suitable means at this point, or that step may be postponed at least until after the next step.

The next step, illustrated by FIG. 8, normally consists of raising the assembly comprising the bars 8 and the hoop 7 to a suitable position intermediate the horizontal sides of the hoop 4 and attaching it, at least to the hoop 4, and preferably to the hoop 2 as well. However, the temporary balancing step can be omitted and the hoop 7 and/or the bars 8 positioned directly.

Finally, as illustrated by FIG. 9, the lower lateral intermediate reinforcing bars 9 are positioned and attached, at least to the hoop 7, and preferably to the hoop 4 as well.

The Second Preferred Embodiment

The second preferred embodiment of the present invention is particularly suitable for use when the reinforcing bars to be assembled are relatively long or where the structure of the finished assembly desired is unusually complicated. However, it will be illustrated with reference to the same assembly used to illustrate the first preferred embodiment.

As previously state, the second preferred embodiment also may being with the steps illustrated by FIGS. 1 and 2.

Figure 10:
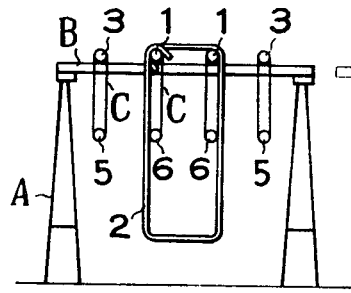
FIGS. 10–16 are side views showing the sequence of fabrication of the same complex assembly by a modified process, again with suspending means A omitted from all but the first figure for the sake of simplicity.
Figure 11:
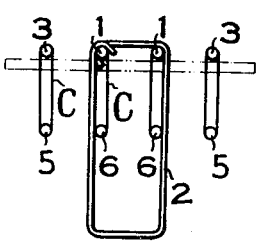

However, as illustrated by FIGS. 10 and 11, the next steps (which may be taken in any order) in this embodiment include the positioning of the hoop 2, the positioning of the upper main reinforcing bars 3, and the temporary suspension of two lower main reinforcing bars 5 and two lower intermediate reinforcing bars 6 from the upper main reinforcing bars 3 and the upper intermediate reinforcing bars 1, respectively.

Figure 12:
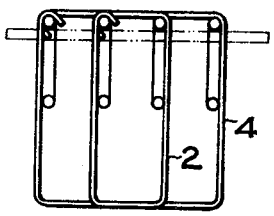
Figure 13:
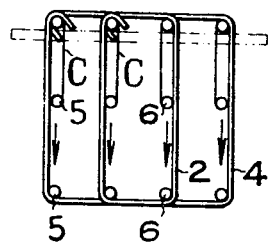
Figure 14:
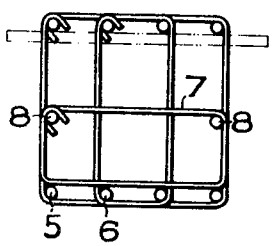
Figure 15:
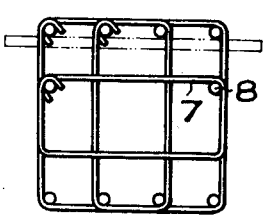
Figure 16:
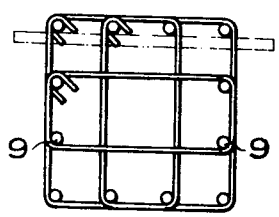
Figure 17:
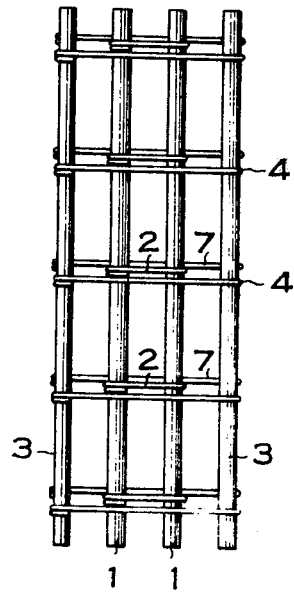
FIG. 17 is an elevation view of a finished columnar assembly of spaced reinforcing bars.

Next, as illustrated by FIG. 12, the external hoop 4 can be positioned, and finally, as illustrated by FIG. 13, the bars 5 and 6 can be lowered from their temporary positions to their permanent positions along the lower portions of hoops 2 and 4. Of course, the order of the above steps can be varied somewhat from the order shown, and all bars and hoops should be attached to each other in the manner previously described. The balance of the fabrication process can be carried out as before, and accordingly, FIGS. 14–16 duplicate FIGS. 7 through 9. Description of these steps will be omitted as duplicative of the description corresponding to the execution of the same steps in the first preferred embodiment.

Caveat

While the present invention has been illustrated by detailed descriptions of two preferred embodiments thereof, it will be obvious to those skilled in the art that various modifications in the ordering of the steps and in the steps themselves may be made without departing from the true scope of the present invention. Accordingly, the present invention must be measured by the attached claims and not solely by the foregoing detailed descriptions of preferred embodiments thereof.

What is claimed is:

1. A process for fabricating a columnar assembly of spaced reinforcing bars comprising the steps of:
    1. suspending two upper main reinforcing bars in horizontal, parallel, spaced relationship;
    2. attaching a first constraining hoop to said upper main reinforcing bars such that said upper main reinforcing bars are attached to said first constraining hoop along the upper portion of said first constraining hoop and said first constraining hoop hangs down from said upper main reinforcing bars;
    3. attaching two lower main reinforcing bars to said first constraining hoop along the lower portion thereof, said lower main reinforcing bars being in horizontal, spaced relationship and parallel to said upper main reinforcing bars;
    4. suspending two upper intermediate reinforcing bars between said upper main reinforcing bars in horizontal, spaced relationship to each other and parallel to said main reinforcing bars;
    5. attaching a second constraining hoop to said upper intermediate reinforcing bars such that said upper intermediate reinforcing bars are attached to said second constraining hoop along the upper portion of said second constraining hoop and said second constraining hoop hangs down from said upper intermediate reinforcing bars;
    6. attaching two lower intermediate reinforcing bars to said second constraining hoop along the lower portion thereof, in horizontal, spaced relationship to each other, and parallel to said upper main reinforcing bars; and
    7. attaching the assembly comprising said main reinforcing bars and said first constraining hoop to the assembly comprising said upper and lower intermediate reinforcing bars and said second constraining hoop.

2. A process as claimed in claim 1 wherein said main reinforcing bars are attached to said first constraining hoop along the interior periphery thereof.

3. A process as claimed in claim 1 wherein said first constraining hoop is quadrilateral in shape.

4. A process as claimed in claim 1 wherein said intermediate reinforcing bars are attached to said second constraining hoop along the interior periphery thereof.

5. A process as claimed in claim 1 wherein said second constraining hoop is quadrilateral in shape and the vertical sides thereof are equal in length to the vertical sides of said first constraining hoop.

6. A process as claimed in claim 1 wherein said process comprises the further steps of:
    1. suspending a first upper lateral intermediate reinforcing bar between a first one of said upper main reinforcing bars and the adjacent one of said lower main reinforcing bars, said first upper lateral intermediate reinforcing bar being in spaced relationship to said first one of said upper main reinforcing bars and to said adjacent one of said lower main reinforcing bars and being parallel to said upper main reinforcing bars;
    2. suspending a second upper lateral intermediate reinforcing bar between the second one of said upper main reinforcing bars and the other one of said lower main reinforcing bars, said second upper lateral intermediate reinforcing bar being in spaced relationship to said second one of said upper main reinforcing bars and to said other one of said lower main reinforcing bars and being parallel to said upper main reinforcing bars;
    3. attaching a third constraining hoop to said first and second upper lateral intermediate reinforcing bars such that said first and second upper lateral intermediate reinforcing bars are attached to said third constraining hoop along the upper portion of said third constraining hoop and said third constraining hoop hangs down from said first and second upper lateral intermediate reinforcing bars;

4. attaching two lower lateral intermediate reinforcing bars to said third constraining hoop along the lower portion thereof, said lower lateral intermediate reinforcing bars being in horizontal, spaced relationship and parallel to each other and parallel to said upper main reinforcing bars; and 5. attaching the assembly comprising said main reinforcing bars and said first constraining hoop to the assembly comprising said lateral intermediate reinforcing bars and said third constraining hoop.

7. A process as claimed in claim 6 wherein said lateral reinforcing bars are attached to said third constraining hoop along the interior periphery thereof.

8. A process as claimed in claim 6 and further comprising the step of attaching the assembly comprising said lateral intermediate reinforcing bars and said third constraining hoop to the assembly comprising said upper and lower intermediate reinforcing bars and said second constraining hoop.

9. A process as claimed in claim 6 wherein said third constraining hoop is quadrilateral in shape and the horizontal sides thereof are equal in length to the horizontal sides of said first constraining hoop.

10. A process for fabricating a columnar assembly of spaced reinforcing bars comprising the steps of:

1. suspending two upper main reinforcing bars in horizontal, parallel, spaced relationship;

2. attaching a first constraining hoop to said upper main reinforcing bars such that said upper main reinforcing bars are attached to said first constraining hoop along the upper portion of said first constraining hoop and said first constraining hoop hangs down from said upper main reinforcing bars;

3. attaching two lower main reinforcing bars to said first constraining hoop along the lower portion thereof, said lower main reinforcing bars being in horizontal, spaced relationship and parallel to said upper main reinforcing bars;

4. suspending a first upper lateral intermediate reinforcing bar between a first one of said upper main reinforcing bars in the adjacent one of said lower main reinforcing bars, said first upper lateral intermediate reinforcing bar being in spaced relationship to said first one of said upper main reinforcing bars and to said adjacent one of said lower main reinforcing bars and being parallel to said upper main reinforcing bars;

5. suspending a second upper lateral intermediate reinforcing bar between the second one of said upper main reinforcing bars and the other one of said lower main reinforcing bars, said second upper lateral intermediate reinforcing bar being in spaced relationship to said second one of said upper main reinforcing bars and to said other one of said lower main reinforcing bars and being parallel to said upper main reinforcing bars;

6. attaching a third constraining hoop to said first and second upper lateral intermediate reinforcing bars such that said first and second upper lateral intermediate reinforcing bars are attached to said third constraining hoop along the upper portion of said third constraining hoop and said third constraining hoop hangs down from said first and second upper lateral intermediate reinforcing bars;

7. attaching two lower lateral intermediate reinforcing bars to said third constraining hoop along the lower portion thereof, said lower lateral intermediate reinforcing bars being in horizontal, spaced relationship to each other and parallel to said upper main reinforcing bars; and 8. attaching the assembly comprising said main reinforcing bars and in said first constraining hoop to the assembly comp sing said lateral intermediate reinforcing bars and in said third constraining hoop.

11. A process as claimed in claim 10 wherein said third constraining hoop is quadrilateral in shape and the horizontal sides thereof are equal in length to the horizontal sides of said first constraining hoop.

12. A process as claimed in claim 10 wherein said lateral reinforcing bars are attached to said third constraining hoop along the interior periphery thereof.

13. A process as claimed in claim 1 and further comprising the steps of:

1. prior to the time said lower main reinforcing bars are attached to said first constraining hoop, temporarily suspending one of said two lower main reinforcing bars from each of said upper main reinforcing bars a distance below it which is less than the distance it is ultimately desired that it be positioned and which is less than the vertical height of the first constraining hoop; and 2. subsequently lowering said lower main reinforcing bars from their temporary positions suspended from said upper main reinforcing bars to their permanent positions along the lower portion of said first constraining hoop.

14. A process as claimed in claim 13 wherein said main reinforcing bars are attached to said first constraining hoop along the interior periphery thereof.

15. A process as claimed in claim 13 wherein said first constraining hoop is quadrilateral in shape.

16. A process as claimed in claim 13 and further comprising the steps of:

1. temporarily suspending a lower intermediate reinforcing bar from each of said upper intermediate reinforcing bars a distance below it which is less than the distance it is ultimately desired that it be positioned and which is less than the vertical height of the second constraining hoop;

2. subsequently lowering said lower intermediate reinforcing bars from their temporary positions suspended from said upper intermediate reinforcing bars to permanent positions along the lower portion of said second constraining hoop;

3. attaching said two lower intermediate reinforcing bars to said second constraining hoop along the lower portion thereof in horizontal, spaced relationship to each other and parallel to said upper main reinforcing bars; and 4. attaching the assembly comprising said main reinforcing bars and said first constraining hoop to the assembly comprising said upper and lower intermediate reinforcing bars and said second constraining hoop.

17. A process as claimed in claim 16 wherein said intermediate reinforcing bars are attached to said second constraining hoop along the interior periphery thereof.

18. A process as claimed in claim 16 wherein said second constraining hoop is quadrilateral in shape and the vertical sides thereof are equal in length to the vertical sides of said first constraining hoop.

19. A process for fabricating a columnar assembly of spaced reinforcing bars comprising the steps of:
1. suspending two upper main reinforcing bars in horizontal, parallel, spaced relationship;
2. attaching a first constraining hoop to said upper main reinforcing bars such that said upper main reinforcing bars are attached to said first constraining hoop along the upper portion of said first constraining hoop and said first constraining hoop hangs down from said upper main reinforcing bars;
3. attaching two lower main reinforcing bars to said first constraining hoop along the lower portion thereof, said lower main reinforcing bars being in horizontal, spaced relationship and parallel to said upper main reinforcing bars;
4. prior to the time said lower main reinforcing bars are attached to said first constraining hoop, temporarily suspending one of said two lower main reinforcing bars from each of said upper main reinforcing bars a distance below it which is less than the distance it is ultimately desired that it be positioned and which is less than the vertical height of the first constraining hoop;
5. subsequently lowering said lower main reinforcing bars from their temporary positions suspended from said upper main reinforcing bars to their permanent positions along the lower portion of said first constraining hoop;
6. suspending two upper intermediate reinforcing bars between said upper main reinforcing bars, said upper intermediate reinforcing bars being in horizontal, spaced relationship to each other and parallel to said main reinforcing bars;
7. attaching a second constraining hoop to said upper intermediate reinforcing bars such that said upper intermediate reinforcing bars are attached to said second constraining hoop along the upper portion of said second constraining hoop and said second constraining hoop hangs down from said upper intermediate reinforcing bars;
8. temporarily suspending a lower intermediate reinforcing bar from each of said upper intermediate reinforcing bars a distance below it which is less than the distance it is ultimately desired that it be positioned and which is less than the vertical height of the second constraining loop;
9. subsequently lowering said lower intermediate reinforcing bars from their temporary positions suspended from said upper intermediate reinforcing bars to permanent postions along the lower portion of said constraining hoop;
10. attaching said two lower intermediate reinforcing bars to said second constraining hoop along the lower portion thereof in horizontal, spaced relationship to each other and parallel to said upper main reinforcing bars; and
11. attaching the assembly comprising said main reinforcing bars and said first constraining hoop to the assembly comprising said upper and lower intermediate reinforcing bars and said second constraining loop.

20. A process as claimed in claim 19 wherein said intermediate reinforcing bars are attached to said second constraining hoop along the interior periphery thereof.

21. A process as claimed in claim 19 wherein said second constraining hoop is quadrilateral in shape and the vertical sides thereof are equal in length to the vertical sides of said first constraining hoop.

* * * * *